United States Patent [19]

Inoue

[11] Patent Number: 4,534,831
[45] Date of Patent: Aug. 13, 1985

[54] METHOD OF AND APPARATUS FOR FORMING A 3D ARTICLE

[75] Inventor: Kiyoshi Inoue, Tokyo, Japan

[73] Assignee: Inoue-Japax Research Incorporated, Yokohama, Japan

[21] Appl. No.: 535,357

[22] Filed: Sep. 23, 1983

[30] Foreign Application Priority Data

Sep. 27, 1982 [JP] Japan .................................. 57-166536
Oct. 4, 1982 [JP] Japan .................................. 57-173247
Nov. 19, 1982 [JP] Japan .................................. 57-202058

[51] Int. Cl.³ .................... C25D 1/10; C25D 1/20; C25D 17/00
[52] U.S. Cl. ...................... 204/4; 204/216; 204/217
[58] Field of Search .................. 204/3, 4, 9, 216, 217, 204/224 M

[56] References Cited

U.S. PATENT DOCUMENTS

| | | | |
|---|---|---|---|
| 3,512,252 | 5/1970 | Sargent | 204/9 |
| 3,699,014 | 10/1972 | Eisner | 204/DIG. 10 |
| 3,753,889 | 8/1973 | Eisner | 204/DIG. 10 |
| 3,799,859 | 3/1974 | Wallin | 204/9 |
| 3,939,046 | 2/1976 | Conn | 204/4 |
| 4,067,782 | 1/1978 | Bailey | 204/9 |
| 4,290,856 | 9/1981 | Inoue | 204/4 |

FOREIGN PATENT DOCUMENTS

| | | | |
|---|---|---|---|
| 1299998 | 12/1972 | United Kingdom | 204/4 |
| 1458260 | 12/1976 | United Kingdom | 204/12 |
| 2066295 | 7/1981 | United Kingdom | 204/12 |

Primary Examiner—Thomas Tufariello
Attorney, Agent, or Firm—Karl F. Ross; Herbert Dubno

[57] ABSTRACT

A method of and apparatus for forming a 3D-shaped article, such as a die or mold, utilizing an electroforming process in which a metal layer is electroformed on an electroforming mold and removed therefrom to form the desired article. The removal is facilitated by mirror-finishing anodizing the shaped electroforming mold and thereafter anodizing to form an oxide film thereon. The electroforming apparatus utilizes a worktank a first and a second region separated by a partition. The partition has a plurality of apertures which provide communication between the first region with the second region, the latter having an anodic electrode and a source of the electroforming metal. The electroforming mold supported by a shank is introduced into the first region and reciprocated longitudinally of the axis of the shank with a stroke not less than the dimension of the electroforming surface of the mold in the direction of that axis. Alternatively or in addition, oscillations may be imparted to the electroforming mold and/or the mold may be rotated. An NC-controlled integral system for producing a desired 3D-article consistently from an electroforming blank material incorporates a tool storage station, an automatic tool changer and an NC unit for rough-machining the electroforming mold in the blank and finish-machining the rough-shaped blank to yield the electroforming mold which is then transferred automatically under NC commands sequentially to the mirror-finishing, anodizing and electroforming stations sequentially.

18 Claims, 5 Drawing Figures

METHOD OF AND APPARATUS FOR FORMING A 3D ARTICLE

FIELD OF THE INVENTION

The present invention relates generally to the preparation of shaped articles, such as dies or molds, which are not flat or planar but more or less of intricate shape. More particularly, the invention relates to a new and improved method of forming an article of three-dimensional shape, e.g. a die or mold such as for dishes or like products, by utilizing an electroforming process. The invention is also concerned with an electroforming mold for use in such a method and with an apparatus for carrying out the method.

BACKGROUND OF THE INVENTION

It is well known that electroforming may be utilized for preparing a die or mold which cannot readily be machined by cutting and other mechanical processes. In this process a layer of metal is electrodeposited on a shaped mold from a solution containing the metal by passing an electric current between the mold poled cathodic and an anode spaced therefrom through the solution, and the metal layer or electroform progressively built up on the mold is subsequently removed therefrom to form a desired article.

Conventional approaches to the electroforming of shaped articles are, however, laborious, time-consuming and expensive and have much to be desired.

A major problem is that the removal of an electroform from the receiving mold particularly is difficult because the former as required conforms intimately to the latter. The difficulty increases as the form complexity or depth increases. The removal may be achieved by dissolving the mold. This measure has been found impractical, however, where the form is intricate since it is difficult then to leave the electroform intact. Moreover, the mold becomes useless. It is quite often desirable that one shaped mold be serviceable for repeated use or for reuse on a purposeful modification. It is thus indeed essential that both the electroform and the forming mold upon separation or physically pulling one off the other be left intact. To facilitate the separation, it is known to mirror-finish the surface of a mold prior to the electroforming process and to paint the mirror-finished mold surface with a lubricating agent such as an iodide or a sulfide. Not only are these measures laborious and time-consuming but they are often unsatisfactory or insufficient to significantly reduce the pulling force required to remove the electroform from the mold. Furthermore, extreme care and skill are required not only in the finishing and painting stages in order to maintain the integrity of the mold surface but in the pulling stage in order not to damage the electroform or the mold, especially again where the form is intricate in shape, or where it is deep and has a large area of surfaces which extend substantially in parallel to the direction in which the pulling force is applied to achieve the removal. A slight mishandling may deform the electroform or cause defects therein. It should also be mentioned that the painting is even detrimental to the subsequent electroforming process results in substantial loss in efficiency and therefore in increased costs.

Another disadvantage inherent to the conventional art of preparing a shaped article from an electroforming mold resides in the slowness, complexity and inefficiency of the electroforming process itself. When a layer of metal is to be electroformed on a mold which is more or less intricate, dendrite or like crystalline formations tend to build up on certain localized areas thereon. In order to reduce these build-ups the electroforming process is carried out at a minimum current density so that it may take several days for the electroformed metal layer to reach a required thickness of 0.5 to 5 mm. However, these undesired formations cannot completely be eliminated even in the low-current density process. It has thus been necessary and the common practice to interrupt the electroforming process from time to time so that the metal layer either on or off the mold is removed from the electroforming machine and transferred to a cutting plant for machining to remove these formations. After each such corrective stage, it is necessary that the metal layer be fully degreased, washed, cleaned, and then returned to the electroforming machine. Since the timing of the need for such removal is generally difficult to predict, the electroforming process must be constantly monitored or otherwise interrupted for nights. Furthermore, the frequency of the interruptions needs to be increased as the electroforming current density is increased which not only accelerates the forming rate but the rate of dendrite build-up and hence the frequency of the need for corrective machining. It is thus apparent that not only is the conventional electroforming process labor-, time- and energy-consuming but it wastes chemicals and other useful resources.

Severe problems in the art also exist in the stages of preparing electroforming molds and their transfer. According to the existing practice, an electroforming mold has been produced by a separate manufacture or at a distant site remote from the electroforming concern so that considerable time, labor and expenditure are again necessary for the transportation. Furthermore, one given electroforming mold is seldom produced in multiples while some of a similar specification may be needed at intervals.

OBJECTS OF THE INVENTION

Accordingly, the present invention generally seeks to provide an improved shaping method and apparatus or system utilizing an electroforming process whereby a shaped article can be prepared generally more efficiently and economically than by the conventional techniques. In particular a shaping method will be described in which a shaped electroform produced on a shaping mold can be removed therefrom more easily and with much less skill, labor and cost than have been entailed heretofore, thus enhancing the efficiency and economy of the entire shaping process. Also the electroforming process and the electroforming mold forming process are generally more efficient and economic.

SUMMARY OF THE INVENTION

The invention provides, in a first aspect thereof, a method of preparing a shaped article by electroforming a layer of metal onto a shaped mold and removing the layer metal therefrom to provide the shaped article, which method comprises the steps of: (a) forming the shaped mold to provide a contoured surface complementary to that of the desired article; (b) mirror-finishing the contoured surface of the shaped mold; (c) subsequently, anodizing the contoured surface so as to form an oxide film thereon at least over a substantial proportion of the surface area thereof to a degree sufficient to facilitate the subsequent removal of the desired article from the mold; and (d) subsequently, electroforming the said layer of metal on the said mold to form the desired article.

Preferably, the magnitude of an anodizing electric current delivered to the said contoured surface and its duration are so selected that their product or the quantity of electricity delivered per unit area lies substantially in a predetermined range, which should preferably be from 0.08 to 0.24 coulomb/cm$^2$.

Sometimes, it has been found desirable that a thin film of metal should be electrodeposited on the contoured surface of the shaped mold mirror-finished in step (b) and this film be at least partly anodized in step (c). The shaped mold may be composed of graphite (high-density), aluminum, brass, a magnesium-based alloy, a zinc-shaped-alloy or other electrically conductive substance which can readily be machined mechanically.

Preferably, the mold is formed in step (a) by rough-shaping a mold blank in a mechanical process, e.g. milling, boring and/or grinding, and finish-shaping the rough-shaped mold by one or more electrical (electroerosive) machining processes.

Preferably, in step (d) the shaped electroforming mold is supported by a shank and disposed in a first region in an electroforming solution retained in a worktank having a second region having a source of the electroforming metal and an anodic electrode disposed therein, the worktank being divided into the first and second regions by a partition having a plurality of apertures providing communication between the first region and the second region. In this embodiment, the electroforming mold is preferably reciprocated, oscillated and/or rotated to agitate the electroforming solution at least adjacent the contoured surface thereof. Preferably, the electroforming solution contains abrasive particles suspended therein.

The invention also provides, in a second aspect thereof, an apparatus for use in a method of preparing a shaped article by shaping an electroforming mold to have a contoured surface complementary to that of the desired article, electroforming a layer of metal on the contoured surface of the mold and removing the electroformed metal layer from the mold to constitute the shaped article, the apparatus comprising an electroforming machine for forming the said metal layer on the said electroforming mold; and means for anodizing the said contoured surface to form an oxide film at least over a substantial proportion of the formed surface area thereof to a degree sufficient to facilitate the removal of the subsequently formed electroformed metal layer from the mold. The combination preferably further comprises means for mirror-finishing the contoured surface of the electroforming mold.

Preferably, the anodizing means comprises a power supply for delivering an anodizing electric current to the electroforming mold, and setting means associated with the power supply for presetting the magnitude and duration of the anodizing current so that the quantity of electricity delivered per unit area is substantially a predetermined value, which is preferably between 0.08 and 0.24 coulomb/cm$^2$.

The electroforming machine preferably comprises a worktank for containing an electroforming solution, the worktank having a first region and a second region divided by a partition having a plurality of apertures providing communication between the first region and the second region and an anodic electrode and a source of the electroforming metal in the second region, support means for the electroforming mold, the support means being movable to introduce the electroforming mold in the first region in the worktank and means for imparting an oscillatory, reciprocatory and/or rotary motion to the electroforming mold to agitate the electroforming solution at least adjacent thereto.

Preferably, the apparatus further comprises workpiece carriage means for supporting a blank to be processed into the electroforming mold, tool carriage means, a numerical control unit, a tool storage station for storing a plurality of shaping tool units including mechanical and electrical machining tool units in a magazine therein, an automatic tool changer operable under commands of the numerical control unit for selecting a mechanical tool unit from the magazine to transfer and secure it to the tool carriage means for rough-shaping the electroforming mold in the blank on the workpiece carriage means and thereafter for returning the mechanical tool unit to the magazine in the tool storage station, and thereafter for selecting an electrical machining tool unit from the tool magazine to transfer and secure it to the tool carriage means for finish-shaping the rough-shaped blank material to yield the said electroforming mold, drive means operable under commands of the numerical control unit to introduce the finished-shaped electroforming mold on the workpiece carriage means into an electroforming solution in a worktank in the said electroforming machine.

BRIEF DESCRIPTION OF THE DRAWING

These and other feature of the present invention as well as advantages thereof will become more readily apparent from the following description of certain preferred embodiments thereof when taken with reference to the accompanying drawing in which.

SPECIFIC DESCRIPTION

Figure 1:
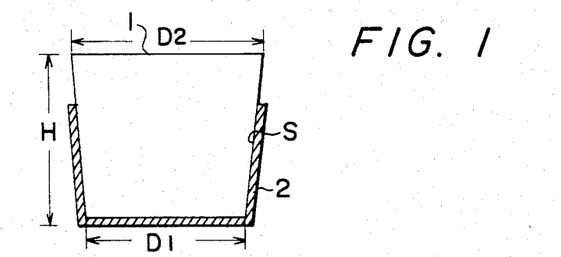
FIG. 1 is a side-elevational view diagrammatically illustrating an electroform formed on an electroforming mold for removal thereof.

Referring now to FIG. 1, an electroforming mold 1 may be composed of nickel and may have a shape of truncated cone as shown having one end with a diameter D1 of 2 cm and the other end with a diameter D2 of 2.4 cm and a height H of 2 cm. The mold 1 is mirror-finished and treated to present an effective electroforming surface S with a total area of 13 cm$^2$ on which a layer of metal 2 may be electroformed. Typically, the electroform 2 has a thickness of 0.5 to 5 mm and the metal is nickel electrodeposited on the surface S from a solution which may contain per liter 600 grams of nickel pyrophosphate, a slight amount of nickel chloride and boric acid. Then the electroform 2 needs to be removed from the mold 1. To achieve the removal, the electroform 2 is externally held by a suitable holder or grasping means and a shank secured to the mold 1 (e.g. by welding) is pulled.

The mirror-finished surface of the mold 1 prior to electroforming is anodized to form an oxide film thereon to facilitate removal of the electroform 2 from the mold 1. To this end, an electric current of 5 amperes is passed, for a short duration of 0.5 second, between the electroform 2 and a cathodic electrode immersed in a chromic acid solution. By virtue of such processing, it has been found that the electroform 2 is removed easily from the mold 1 with a pulling force of 28 Kg. With the anodizing processing omitted, a pulling force as high as 200 Kg is required together with considerable skill to remove the electroform 2 from the mold 1.

Figure 2:
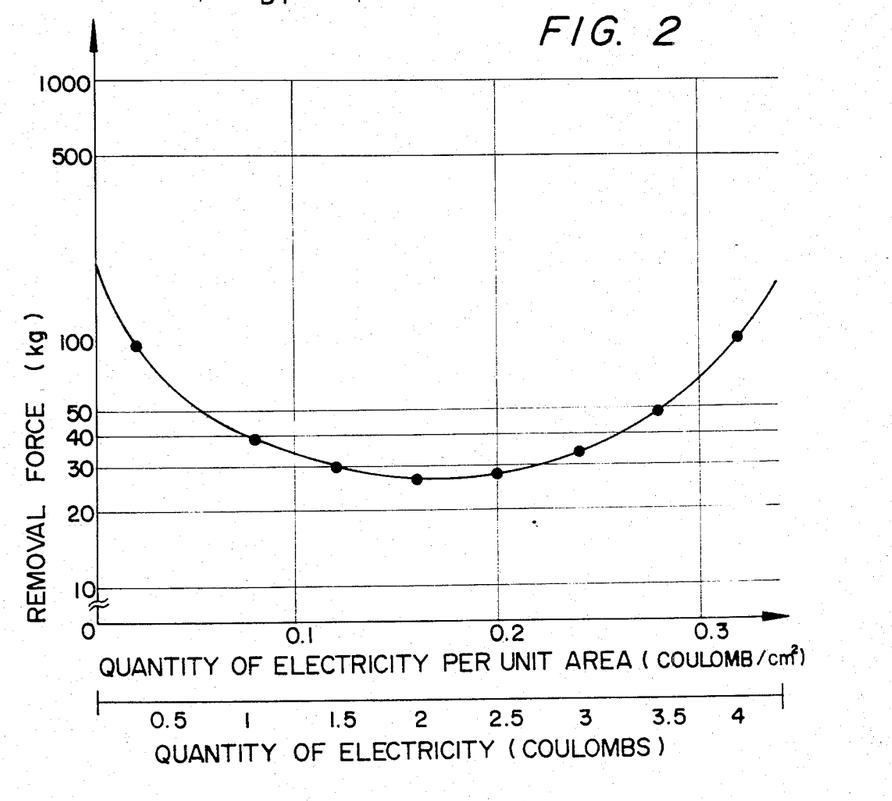
FIG. 2 is a graph illustrating a preferred embodiment of the present invention.

Mirror-finished electroforming molds 1 of the same shape and size as hereinbefore shown and described as were anodized using different magnitudes of electric current passed for various durations. Each mold was then used to perform electroforming described. In FIG. 2 there is shown a graph in which the pulling force required to remove the resulting electroform 2 from the mold 1 in each case is plotted in kg along the ordinate. Plotted along the abscissa is the product of the electric current (ampere) and duration (second), hence the quantity of electricity, during term of coulombs, applied in the anodizing process as well as that product divided by the surface area of 13 cm$^2$, and hence the quantity of electricity in term of coulumb/cm$^2$. It is shown that best results are obtained when the quantity of electricity per unit area lies in the range between 0.08 and 0.24 coulomb/cm$^2$. It will be appreciated that anodizing, which requires a current delivery for only a short duration of time is simple and, markedly facilitates the electroform removal process. It has been found that as the quantity of electricity per unit area is increased above the optimum range, the electroforming mold gets progressively rougher, a cause which necessitates again a progressively greater force for the removal.

It is noted that anodizing shown to markedly facilitate the mold removal process surprisingly, requires no particular skill and indeed is simple and economical in procedure inasmuch as this procedure can be carried out in the same electroforming apparatus, requiring only a slight modification of the power supply therefor.

Figure 3:
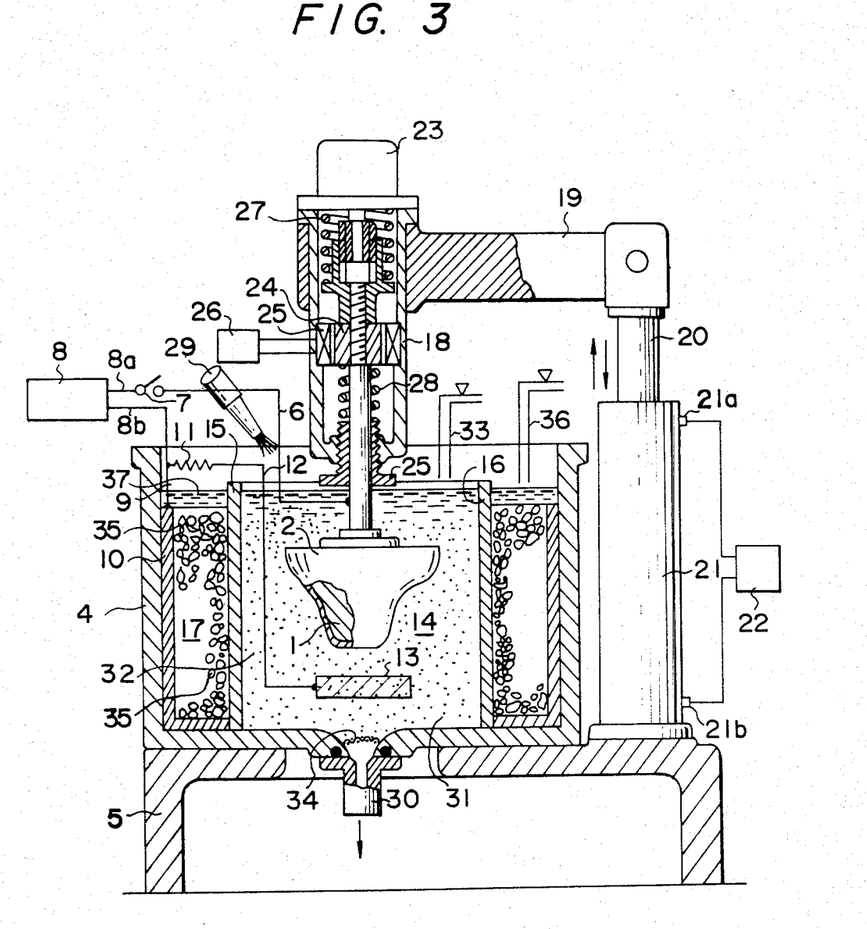
FIG. 3 is an electroforming apparatus embodying the principles of the present invention.

In FIG. 3 there is shown an apparatus for carrying out the method described. In the apparatus, an electroforming mold 1, which may be composed of stainless steel or nickel, is shown as having a layer of metal 2 (e.g. nickel) electroformed thereon and as being secured to (e.g. by welding) and supported by a shank 3 in an electroforming tank 4 which may be mounted on a base 5. The shank 3, which is electrically conductive, has an electrical lead 6 attached thereto which is shown as connected via a switch 7 to one output terminal 8a of a power supply 8. The other output terminal 8b of the power supply 8 is connected on one hand via an electrical lead 9 to a first electrode 10 attached to the inner wall of the tank 4 and on the other hand via a resistor 11 and an electrical lead 12 to a second electrode 13. The mold 1 and the second electrode 13 are disposed in a processing chamber 14 which is defined by a porous cylinder or cylinder 15 having a plurality of through-holes 16 uniformly spaced apart through the wall thereof. The cylinder 15 is coaxial with the tank 4 about the axis of the shank 3 and acts as a partition to separate the processing chamber 14 from the annular region 17 surrounding the cylinder 15 within the tank 4.

The shank 3 supporting the electroforming mold 2 and extending vertically is slidably received in a housing 18 constituting the machine head which is carried by a horizontally extending arm 19. The arm is mounted on a vertically extending ram 20 which is slidably received in a cylinder 21 standing upright on the machine base 5. The cylinder 21 has a pair of fluid ports 21a and 21b through which a pressure fluid is introduced and withdrawn under control of a drive controller 22 to drive vertical displacements of the ram 20 and hence of the machine head 18. The ram 20 is driven on one hand to vertically position the mold 1 and on the other hand to vertically reciprocate the same.

The shank 3 supporting the mold 2 is also connected to the output shaft of a motor 23 and is rotatable thereby to rotate the mold 2 about its axis. The shank 3 also has an annular magnetic core member 24 secured thereto which is associated with an electromagnetic coil 25. The coil is energized by a current source 26 to oscillate the electroforming mold 1 vertically with a small amplitude. To this end, the shank 3 is resiliently supported by springs 27 and 28 within the housing 18.

Fluid inlet means 29 is shown as disposed above the processing chamber 14 and may comprises a plurality of nozzles communicating with an equal plurality of fluid sources (not shown), respectively. The fluid in the chamber 14 is drained through an outlet 30. Abrasive particles 31 are also shown as suspended in a liquid 32 retained in the processing chamber 14 and are supplied therein through an inlet 33. A mesh screen 34 disposed at the fluid outlet 30 serves to retain the abrasive particles 31 within the processing chamber 14.

Shown in the annular region 17 between the apertured cylinder 15 and the tank 4 is a mass of discrete bodies 35 of an electroforming metal (e.g. nickel) which is introduced through an inlet 36 and dissolved into an electroforming solution 37 where the power supply 8 supplies electroforming current.

The apparatus shown and described is designed to carry out an entire process of producing a shaped articles 2 from a correspondingly shaped electroforming mold 1, i.e. comprising preliminary steps of processing the mold 1 to facilitate removal of the electroform 2 from the mold 1 in the final stage and the subsequent electroforming step. To this end, the power supply 8 is adapted to be switched to pole the terminal 8a positive during the preliminary steps and negative during the electroforming step.

During the electroforming step, the electroforming solution 37 is introduced through the inlet means 29 into the cylinder 15 to fill the chamber 14, the solution introduced being allowed to pass through the apertures 16 to fill the annular region 17 as well. Also, the discrete bodies 35 of the electroforming metal are supplied into the annular region 17 through the inlet 36 while the abrasive particles 31 such as fine alumina grains are introduced into the chamber 14 through the inlet 33 to form a suspension thereof in the electroforming solution 32 within the chamber 14. Then, the switch 7 is closed and the power supply 8 is switched to pole the electroforming mold 1 negative and the electrodes 10 and 13 negative. The metal of the discrete bodies 35 is thus allowed to dissolve electrolytically into the solution 37 and then allowed to migrate through the apertures 16 into the chamber 14 to form the electroforming solution 32 therein. Thus, the metal in the solution is electrodeposited on the mold 1 under electric potentials between the electrodes 10 and 13 and the cathodic mold 1 to progressively build up a layer 2 of the metal thereon. As the process continues, undesirable dendritic and like irregular crystallic formations tend to build up on the metal layer 2 being electroformed on the mold as described previously. This tendency is minimized by imparting a rotation, an oscillation and/or a reciprocation to the electroforming mold.

Thus, the motor 23 may be driven to rotate the electroforming mold 1 at a rate of 200 to 2000 rpm and typically around 1000 rpm although the optimum rate depends on the particular size of the mold 1. It has been found that the minimum rate of 200 rpm, is required to prevent the irregular crystaline formations while a rate greater than 2000 rpm is not necessary.

The current supply 26 may be turned on to oscillate the electroforming mold at a frequency of 2 to 10 Hz, preferably 3 to 5 Hz and with an amplitude of 2 to 10 mm, preferably around 5 mm.

The hydraulic cylinder 21 may be actuated to vertically reciprocate the electroforming mold 1 at a rate of reciprocation between 0.1 and 5 cycles/second, preferably between 0.5 and 3 cycles/second and with a stroke of reciprocation which is approximately equal to or greater than the vertical effective height of the electroforming mold 1.

By virtue of the foregoing, it has been found that the electroforming current can be increased provide a current density amounting to 15 to 40 A/dm$^2$, i.e. five to ten times as high as those employable conventionally and, in some cases, even to 80 to 100 A/dm$^2$ without the fear of the irregular crystal growth. Thus, electroforming is allowed to proceed at an extremely high rate, say 0.5 mm/Hr (at 40 A/dm$^2$) or 1 mm/Hr (at 80 A/dm$^2$) practically without the undesirable crystalline formations. As a result, the need to interrupt an electroforming operation for the surface rectification machining can practically be eliminated.

Preferably, abrasive particles 31, e.g. alumina or silica grains of 60 to 1000 meshes (ad used in fluid horning) or conventional barrel chips of 0.1 to 10 mm size, are introduced through the inlet 33 into the electroforming chamber 14 when a thin layer of metal electrodeposit of a thickness of 0.2 to 0.3 mm builds up on the mold 1. Then, the electroforming current from the power supply 8 is increased to elevate the current density to or maintained to hold it at, the abovementioned high level while the rotation, oscillations and/or reciprocations of the electroforming mold 1 are initiated or continued. Under these conditions, particles 31 act not only to dynamically abrade off the dendritic and other irregular crystalline growth but they exert a constant dynamic knocking action on the metal being electrodeposited, thus contributing to a marked increase in the density of the electroform 2.

The cylinder 15 for the electroforming chamber 14 may be modified so that apertures 16 have their widths which are larger both in vertical and horizontal directions but smaller than the corresponding widths of the mold 1. The cylinder 15 should then be constructed to have these apertures adjacent to the mold 1 so that the chamber 14 communicates with the annular region 17 only through the apertures which are preferably arranged at a same vertical level. In this modification, the electroforming current between the mold 1 and the anode 10 is localized through these apertures to localize the electrodeposition on the surfaces adjacent thereto with an increased current density, establishing what can be called "zone depositing" mode. The rotation and axial reciprocations of the mold 1 described serve then to effectively extend the "zone deposition" over the entire surface of the mold 1.

The preliminary steps for the electroforming step described comprise mirror-finishing and anodizing the electroforming mold 1. Advantageously, these steps are carried out with the same basic apparatus described.

In the mirror-finishing step, the shaped electroforming mold 1 carried by the shank 36 is introduced into the processing chamber 14 which contains a suitable fluid supplied through the nozzle means 29. Abrasive particles 31 may be introduced through the inlet 33 to form a suspension thereof in the fluid 32 within the chamber 14. The cylinder 21 is actuated, the motor 23 is driven and/or the coil 25 is energized to reciprocate, rotate and/or oscillate the electroforming mold 1 as previously described. The abrasive particles 31 are thus dynamically agitated with the fluid 32 to mechanically polish the mold 1 in the processing chamber 14. Preferably, the electroforming mold 1 is mirror-finished and brightened by using an electrochemical process instead of or in addition to the mechanical abrasion. To this end, the fluid 32 should be a suitable liquid electrolyte, e.g. an alkaline solution containing sodium sulphamate, sodium chloride, glycerol and water and this solution is particularly advantageous when the mold 1 is composed of steel. The power supply 8 is switched to pole the mold 1 positive and the electrode 13 negative to electrolytically dissolve minute projections on the mold surface into the solution thus to smooth and at the same time to brighten the surface. The mold 1 is then withdrawn from the chamber 14 by actuating the drive cylinder 21 and the polishing solution 32 in the chamber 14 is drained through the outlet 30.

The mirror-finished surface of the mold 1 is then subjected to the anodizing step to form an oxide film thereon designed to facilitate removal of the electroform from the mold. To this end, while the oxide film is formed simply by exposing the withdrawn mold 1 to air for a substantial time period, the process of anodizing is promoted and for the best result, should be carried out in a manner as previously described and advantageously here again in the processing chamber 14. Thus, a suitable anodizing electrolytic solution is introduced into the chamber 14 through the nozzle means 29 and may be a chromic acid solution. Alternatively, the solution may be a nitric acid solution. The power supply 8 continues to pole the mold 1 positive and the electrode 13 negative and has its current output characteristics regulated to anodically form an oxide film on the mirror-finished surface of the mold 1. Preferably, the anodizing power supply has a setting unit associated therewith for presetting the magnitude of the electric current and the time period for the passage thereof so that their product or the quantity of electricity for delivery, per unit area of the effective electroforming surface of the mold 1 is a predetermined value, preferably between 0.08 and 0.24 coulomb/cm$^2$, more preferably around 0.18 coulomb/cm$^2$. Upon delivery of the preset quantity of electricity, the power supply is arranged to be turned off to terminate the anodizing current.

Sometimes, it has been found desirable that a thin layer of a metal be electrodeposited on the mirror-finished mold 1 and anodized to form an oxide film on that layer. Such a metal, which may, for example, be nickel, copper or silver, is selected depending on the particular metal to be eventually electroformed. In this case, the mold 1 may be composed advantageously of a mechanically readily machinable, electrically conductive substance such as graphite, aluminum, brass or magnesium.

Figure 4:
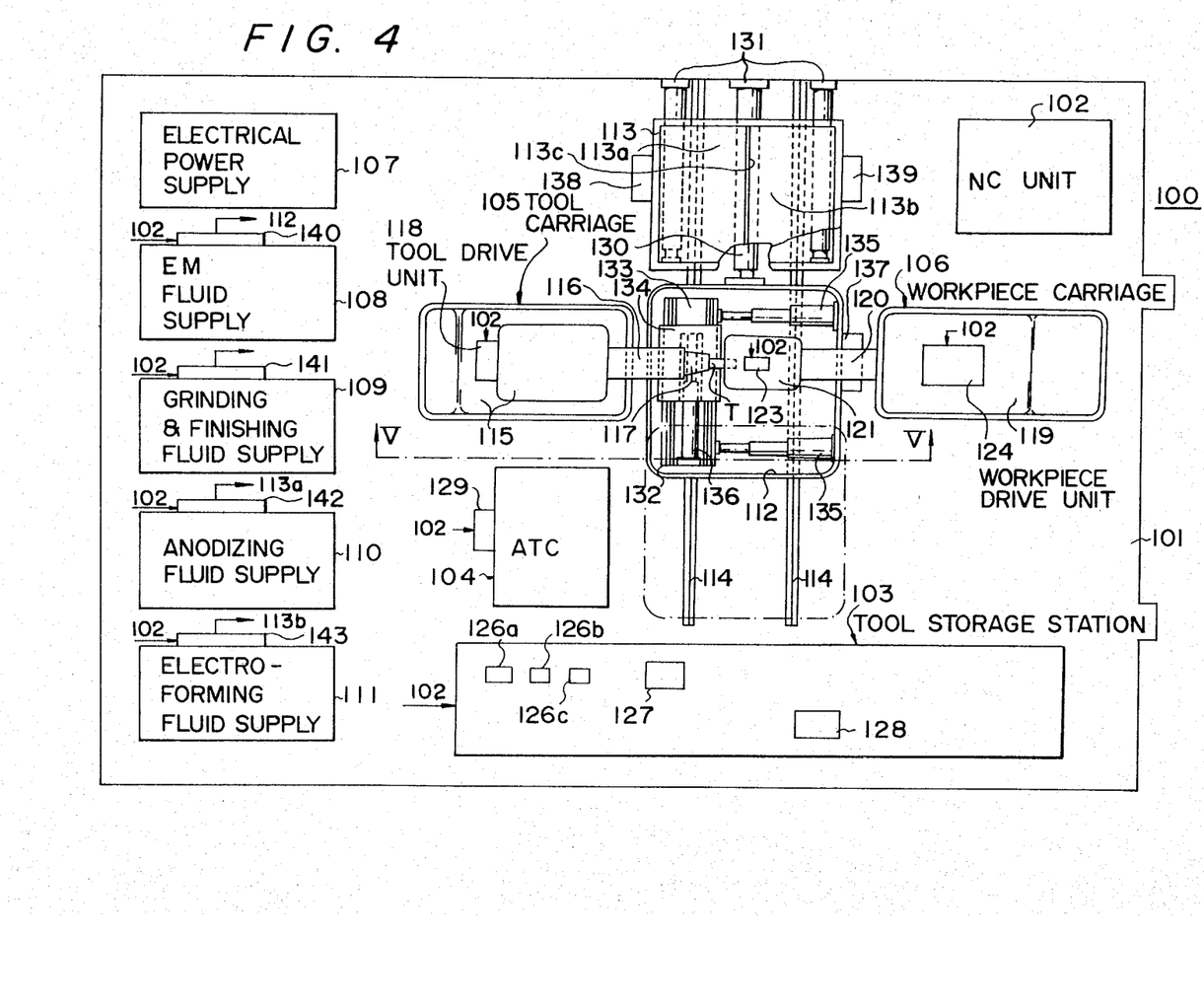
FIG. 4 is a plan view diagrammatically illustrating an NC-controlled unitary system for producing a shaped article from a blank material for a required electroforming mold.
Figure 5:
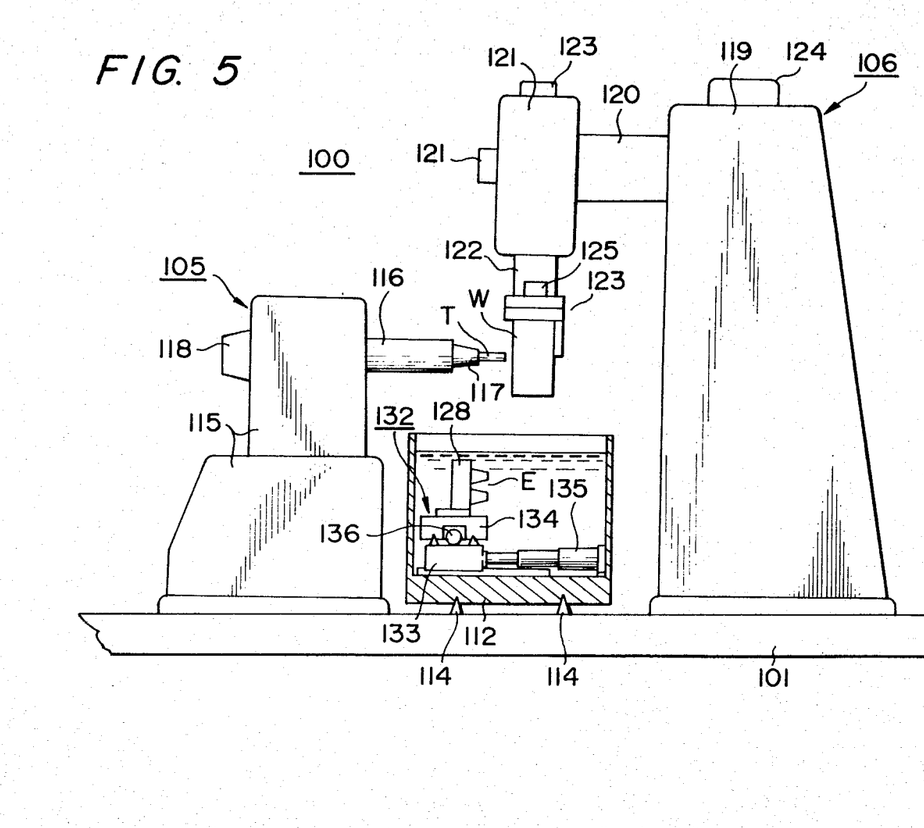
FIG. 5 is diagrammatic front elevational view of a certain structure in the system of FIG. 4.

FIGS. 4 and 5 show a unitary system 100 adapted to perform a plurality of different processing functions under numerical control (NC) for producing an electroformed 3D-shaped article, such as die or mold from an electroforming mold blank material. In addition to mirror-finishing, preliminary electrodeposition and anodizing as previously described, these functions comprises different machining functions for rough- and finish-shaping an electroforming mold 1 (FIGS. 1 and 3) with different types of tool or tool units T. Rough-shaping may be carried out by milling, boring and/or grinding. Finish-machining may be carried out by one or more forms of electrical (electroerosive) machining (EM), e.g. electrical discharge machining (EDM), or electrochemical machining (ECM), electrochemical-discharge machining (ECDM). Electrochemical grinding (ECG) may also be used.

The system 100 is built on a common base 101 which carries all units which are organized to operate under commands of an NC unit 102. These units include a tool storage station 103, an automatic tool chamber (ATC) 104, a shaping tool carriage 105, a workpiece carriage 106, an electric power supply unit 107, a plurality of fluid supply units 108–111, and worktanks 112 and 113. The work tanks 112 and 113 are arranged to movably ride on a pair of guide rails 114 traversing a space provided between the tool carriage 105 and the workpiece carriage 106 on the base 101.

The tool carriage 105 shown has the structure of a conventional milling, boring or grinding machine and comprises a vertical column 115 which carried a horizontally projecting spindle 116. A tool holder 117 for securely supporting a tool or tool assembly T is rotatably received in the spindle 116, which is movable along its axis and also translationally in both vertical and horizontal directions with respect to the column 115. The spindle 116 and tool holder 117 are driven by a drive assembly 118, thus on the one hand to rotate the tool T along its axis and on the other hand to translationally move it three-dimensionally. The drive assembly 118 operates under commands of the NC unit 102.

The workpiece carriage 106 comprises a vertical column 119 which carries a horizontally projecting arm 120. The arm 120 is movable on the one hand along its axis and on the other hand translationally in a horizontal plane with respect to the column 119. The arm 120 carries on its end a head member 121 which in turn carries a vertical stem 122 at the end of which is securely supported a workpiece W by means of a coupling 123. The stem 122 is vertically movable with respect to the head member 121. The horizontal arm 120 and the vertical stem 122 are driven by a drive assembly 124, thus to move the workpiece W three-dimensionally. The drive assembly 124 operates under commands of the NC unit 102. In addition, oscillatory and/or rotary drives 21, 23 are also associated with the head member 121 to operate in manners as described in connection with FIG. 3 under commands of the NC unit 102. The coupling 123 is provided with a drive assembly 125 adapted under commands of the NC unit 102 to rotate the workpiece W through 90° with respect to the stem 122. In addition, the coupling has an electrical input terminal for connection to the power supply 107.

The tool storage station 103 has a plurality of tools and tool assemblies T releasably held in its magazine. These tools and tool assemblies T includes milling or drilling tools of different types 126a, 126b, 126c, and EM and ECG assemblies 127 and 128. The or each EM assembly 127 comprises an EM electrode tool, a tool support for connection with the tool holder 117, a fluid flushing nozzle for connection to the EM fluid supply 108 and an electrical input terminal for connection to the power supply 107. The ECG assembly 128 comprises an electrically conductive, abrasive wheel, a holding member, a fluid flushing nozzle for connection with an ECG fluid supply 109 and an electrical input terminal for connection with the electrical power supply 107.

The ATC 104 has, though not shown, a vertically standing rotary column rotationally movable between the tool storage station 103 and the tool carriage 105 and provided with manipulator arms designed to grapple and release a selected one of the tools or tool assemblies T on the tool storage station 103 and to secure it to and to release it from the tool holder 117 on the tool carriage 105. These functions are achieved by a drive assembly 129 under commands of the NC unit 102.

The worktanks 112 and 113 have their drive units 130 and 131 shown in the form of hydraulic actuators. Each of these drive units is operated under commands of the NC unit 102 to position the corresponding worktank below the head member 121 of the workpiece carriage 106. When EDM is carried out within the worktank 121, this worktank contains a liquid dielectric and is shown to have a compound table 132 arranged therein, having the EDM tool unit 128 securely mounted thereon and comprising a X-axis displacement table 133 and a Y-axis displacement table 134 which are assembled in a cross-feed arrangement for displacement by hydraulic actuators 135 and 136, respectively. The actuator 135 and 136 are again designed to operate under commands of the NC unit 102 to enable the electrode tool E to machine EDM the forcing workpiece W in the worktank 112. The worktank 113 has two receptacles 113a and 113b separated by a partition 113c. The receptacle 113a is designed to perform an anodizing operation as previously described and the receptacle 113b is designed to perform electrodepositing and electroforming operations as previously described. The worktank 112, receptacle 113a and 113b are provided their respective fluid terminals (inlets and outlets) 137, 138 and 139 which communicate respectively with fluid supply units 108, 110 and 111, respectively. The fluid supply units 108–111 have their respective reservoirs and are provided with their respective fluid pumping and circulation devices 140–143, each of which here again operates under commands of the NC unit 102.

The electrical power supply constitutes the power source for all active elements in the system and also contains respective supply units for furnishing the individual forms machining or processing power required in EM, ECG, mirror-finishing, electrodepositing, anodizing and electroforming.

The workpiece W is initially a blank material to be shaped into an electroforming mold 1 (FIGS. 1 and 3). The shaping is carried out in a plurality of steps to machine the blank W in progressive degrees for the shape integrity of the desired mold.

In the first step, the blank material W is milled, ground or drilled into a form roughly resembling the desired form of an electroforming mold 1. The ATC 104 is operated under sequential commands of the NC unit 102 to select and grapple an appropriate tool 126 in the tool storage station 103, and transfer and to secure it to the tool holder 117 in the tool carriage 105. The drive assemblies 102 and 120 are then operated to establish and continue the desired rough-shaping process.

Upon termination of the initial step, the ATC 104 is operated again under sequential commands of the NC unit 102 to return the rough-shaping tool 126 to the tool storage station 103. The actuator 130 is then operated to bring the worktank 112 below the head member 121. The ATC 104 then selects and grapple the EDM tool unit 128, to transfer and secure it onto the compound table 132 in the worktank 112. The pumping device 140 is then actuated to deliver a liquid dielectric into the worktank 112 directly and also through the nozzle attached to the tool unit 128. The EDM machining circuit connection is completed and the drive 102 is actuated to bring the workpiece into the worktank 112 to establish EDM conditions. The actuators 135 and 136 are then driven to allow the EDM operation to proceed to finish the rough-shaped blank W, thus yielding the shaped electroforming mold 1.

Alternatively, for the EDM operation, the ATC 104 may be operated to transfer and secure the EDM tool 128 to the tool holder 117 on the tool carriage 105.

Sometimes, it is desirable that an ECG operation be replaced with or preceded by the initial step or interposed between the rough-shaping and EM-finish operations. In this case, too, the tool carriage 105 may be used to carry on its tool holder 117 the ECG tool unit 127 transferred by the ATC from the tool storage station.

The mirror-finishing operation for the shaped electroforming mold 1 may be executed by an ECG process, too, using an abrasive polishing tool 127' transferred from the tool storage station and secured to the tool carriage 105 by the ATC 104.

In these ECG processes, the pumping device 141 is operated to furnish an ECG fluid from the supply 109 between the tool 127, 127' and the workpiece W.

The mirror-finishing may also be performed in the receptacle 113a of the worktank 113 as already described in connection with FIG. 3. To this end, the actuators 130 and 131 are operated to remove the worktank 112 from below the head member 121 and to replace it with the worktank 113. The drive unit 125 is actuated to rotate the mold 1 (W) through 90° so as to face an electrode 13 (FIG. 13) disposed in the receptacle 130a.

The mold 1 is then transferred into the receptacle 113b by operating the drive assembly 124 to form a thin film of metal electrodeposit on the mirror-finished surface of the mold. The corresponding current source in the power supply unit 107 is turned on to initiate and continue the preliminary deposition process. Prior to this process, the pumping device 143 is operated to supply an electrodepositing solution into the receptacle 113b.

For the anodizing step, the pumping device 142 is operated to deliver an anodizing electrolyte (e.g. chromic acid) into the receptacle 130a and the drive assembly 102 is actuated to displace the mold 1 into this receptacle. The anodizing current source in the power supply unit 107 is turned on to form an oxide film on the mirror-finish or electrodeposited surface of the mold 1.

Finally, the mold 1 is transferred back to the receptacle 113b and an electroforming operation as previously described in connection with FIG. 3 follows.

What is claimed is:

1. A method of making a shaped article, comprising the steps of:

(a) preparing a shaped mold having a contoured surface complementary to that of the shaped article;
   (b) electroforming a layer of metal onto said mold;
   (c) without destroying said mold, mechanically separating said layer of metal therefrom to provide said shaped articles and, subsequent to step (a) and prior to step (b),
   (d) mirror-finishing the contoured surface of said shaped mold; and
   (e) anodizing the mirror-finished contoured surface to form an oxide film thereon at least over a substantial proportion of the surface area thereof to a degree sufficient to assure the mechanical separation in step (c) without impairing said electroformed layer of metal and without materially destroying said mold.

2. The method defined in claim 1 wherein in step (e), the mirror-finished, contoured surface is anodized by passing across said substantial portion of the surface area thereof an anodizing electric current of a magnitude for a time period, further comprising the steps of:

in conjunction with said substantial portion of the surface area, selecting said magnitude and duration so that their product or the quantity of electricity delivered per unit area lies within a predetermined range between 0.08 and 0.24 coulomb/cm$^2$.

3. A method as defined in claim 1 or claim 2, further comprising the step of electrodepositing a thin film of metal on the contoured surface of the mold mirror-finished in step (d) so that said thin film of metal is at least partly anodized in step (e).

4. The method defined in claim 3 wherein said shaped mold is composed of a substance selected form the group which consists of a graphite, aluminum, brass, an aluminium based alloy, a magnesium-based alloy and a zinc-based alloy.

5. The method defined in claim 1 wherein said shaped mold is prepared in step (a) by rough-shaping a mold blank using a mechanical process and finish-shaping the rough-shaped mold in an electrical machining process.

6. The method defined in claim 1 wherein in step (b) said shaped mold is supported by a shank and disposed in a first region of an electroforming solution retained in a worktank, a second region of the solution having a source of the electroforming metal and an anodic electrode disposed therein, said worktank dividing said first and second regions by a partition having a plurality of apertures providing communication between said first region and said second region, further comprising the step of agitating said electroforming solution at least adjacent to said electroforming mold by imparting at least one kind of periodic motion to said shank.

7. The method defined in claim 6 wherein said periodic motion is imparted to said electroforming mold by reciprocating said shank substantially longitudinally of the axis thereof at a rate of reciprocation between 0.1 and 5 cycles/second with a stroke substantially not less than the dimension of the electroforming surface of said mold in the direction of said axis.

8. The method defined in claim 6 wherein said periodic motion is imparted to said electroforming mold by oscillating said shank with an amplitude in the range of 2 to 10 mm and at a frequency in the range of 2 to 10 Hz.

9. The method defined in claim 6 wherein said periodic motion is imparted to said electroforming mold by rotating said shank about its axis at a speed of 200 to 2000 rpm.

10. The method defined in claim 7, claim 8 or claim 9 wherein said electroforming solution contains abrasive particles suspended therein.

11. An apparatus for use in a method of preparing a shaped article by shaping an electroforming mold to have a contoured surface complementary to that of the shaped article, electroforming a layer of metal on the contoured surface of the mold and removing the electroformed metal layer from the mold to constitute the shaped article, the apparatus comprising:
   an electroforming machine for forming said metal layer on said electroforming mold; and
   means for anodizing said contoured surface upon mirror-finishing to form an oxide film thereon at least over a substantial portion of the surface area thereof to a degree sufficient to facilitate the mechanical removal of said electroformed metal layer from said mold without destroying said electroforming mold and without impairment of said electroformed layer, said anodizing means having a power supply for delivering an anodizing electric current to said electroforming mold and setting means associated with said power supply for setting the magnitude and the time of delivery of said anodizing electric current in conjunction with each other and with the area, of said substantial portion such that the product of said magnitude and said time per unit area viz. the quantity of electricity delivered per unit area of said substantial portion lies within a predetermined range substantially independent of said area of the substantial portion.

12. The apparatus defined in claim 11, further comprising means for mirror-finishing said contoured of the mold.

13. The apparatus defined in claim 11 or claim 12 wherein said electroforming machine comprises:
   a worktank for holding an electroforming solution, the worktank having a first region and a second region divided by a partition having a plurality of apertures providing communication between the first region and the second region and an anodic electrode and a source of the electroforming metal in said second region,
   support means for the electroforming mold, the support means being movable to introduce said electroforming mold in said first region in said worktank and
   agitation means for imparting a periodic motion to said electroforming mold to agitate said electroforming solution at least adjacent thereto.

14. The apparatus defined in claim 13 wherein the agitation means comprises means for reciprocating said electroforming mold with a stroke substantially not less than a height of said electroforming mold and at a rate between 0.1 and 5 cycles/second.

15. The apparatus defined in claim 13 wherein the agitation means comprises means for oscillating said electroforming mold at an amplitude of 2 to 10 mm and at a frequency of 2 to 10 Hz.

16. The apparatus defined in claim 13 wherein the agitation means comprises means for rotating said electroforming mold about its axis at a rate between 200 and 2000 rpm.

17. The apparatus defined in claim 12, further comprising:
   workpiece carriage means for supporting a blank material to be processed into said electroforming mold,
   tool carriage means,
   a numerical control unit,
   a tool storage station for storing a plurality of tool units including mechanical and electrical machining tool units in a magazine thereof,
   an automatic tool changer operable under commands of said numerical control unit to select a mechanical tool unit from said magazine and to transfer and secure it to said tool carriage means for rough-shaping said blank on said workpiece carriage means and thereafter for returning the mechanical tool unit to said magazine in said tool storage station, and thereafter for selecting an electrical machining tool unit in said tool magazine to transfer and secure it to said tool carriage means for finish-shaping the rough-shaped blank to yield said electroforming mold, and
   drive means operable under commands of said numerical control unit for introducing said finish-shaped electroforming mold into an electroforming solution in a worktank in said electroforming machine.

18. The apparatus defined in claim 17 wherein said mechanical tool unit comprises at least one milling tool and said electrical machining tool unit comprises at least one electrical discharge machining tool electrode.

\* \* \* \* \*